US012695380B2

(12) United States Patent (10) Patent No.: US 12,695,380 B2
Peetala et al. (45) Date of Patent: Jul. 28, 2026

(54) CAPACITOR CROSS-COUPLED LEVEL SHIFTER

(71) Applicant: Texas Instruments Incorporated, Dallas, TX (US)

(72) Inventors: Kishore Peetala, Vizianagaram (IN); Venkateswarlu Ramaswamy T, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/340,128

(22) Filed: Jun. 23, 2023

(65) Prior Publication Data

US 2024/0388294 A1 Nov. 21, 2024

(30) Foreign Application Priority Data

May 15, 2023 (IN) .............................. 202341033996

(51) Int. Cl.
  H02M 3/07 (2006.01)
  G05F 1/46 (2006.01)
(52) U.S. Cl.
  CPC ............. H02M 3/07 (2013.01); H02M 3/073 (2013.01); G05F 1/46 (2013.01)
(58) Field of Classification Search
  None
  See application file for complete search history.

(56) References Cited

U.S. PATENT DOCUMENTS

| | | | | |
|---|---|---|---|---|
| 4,539,551 A | * | 9/1985 | Fujita | H03K 5/249 |
| | | | | 341/158 |
| 5,701,096 A | * | 12/1997 | Higashiho | G11C 5/145 |
| | | | | 327/536 |
| 5,889,427 A | * | 3/1999 | Nakajima | H02M 3/073 |
| | | | | 327/540 |
| 6,198,340 B1 | * | 3/2001 | Ting | H02M 3/073 |
| | | | | 327/390 |
| 6,275,070 B1 | * | 8/2001 | Pantelakis | G11C 7/22 |
| | | | | 326/62 |
| 6,373,327 B1 | * | 4/2002 | Nakamura | H02M 3/073 |
| | | | | 327/536 |
| 6,798,246 B2 | * | 9/2004 | Chen | H03K 3/35613 |
| | | | | 326/98 |
| 7,106,123 B2 | * | 9/2006 | Kanno | H03K 19/018521 |
| | | | | 327/333 |

(Continued)

*Primary Examiner* — Thomas J. Hiltunen
(74) *Attorney, Agent, or Firm* — Zhenhai Fu; Frank D. Cimino

(57) ABSTRACT

Described embodiments include a level-shifter circuit having first and second buffers. A second terminal of a first capacitor is coupled to the output of the first buffer. A second terminal of a second capacitor is coupled to the output of the second buffer. A first transistor is coupled between an input voltage terminal and the first terminal of the first capacitor, and has a first control terminal coupled to the first terminal of the second capacitor. A second transistor is coupled between the input voltage terminal and the first terminal of the second capacitor, and has a second control terminal coupled to the first terminal of the first capacitor. An overvoltage discharge circuit is configured to maintain a voltage imbalance between a first voltage across the first capacitor and a second voltage across the second capacitor to within a threshold voltage.

24 Claims, 7 Drawing Sheets

(56)          References Cited

U.S. PATENT DOCUMENTS

| | | | |
|---|---|---|---|
| 7,145,363 B2 | 12/2006 | Kim | |
| 7,176,742 B2 | 2/2007 | Aksin et al. | |
| 7,199,617 B1 | 4/2007 | Schrom et al. | |
| 7,710,152 B1 * | 5/2010 | El Bacha | H03K 3/356113 |
| | | | 326/83 |
| 8,456,216 B2 | 6/2013 | Oh | |
| 8,779,732 B2 * | 7/2014 | Inoue | H02M 3/07 |
| | | | 323/222 |
| 8,988,118 B1 | 3/2015 | Faucher et al. | |
| 9,190,897 B2 | 11/2015 | Dai et al. | |
| 9,778,672 B1 * | 10/2017 | Gao | G05F 1/575 |
| 10,298,120 B2 * | 5/2019 | Murata | H02M 3/07 |
| 10,396,793 B2 | 8/2019 | Furuichi | |
| 11,431,327 B2 | 8/2022 | Balteanu et al. | |
| 2005/0169027 A1 * | 8/2005 | Bayer | H03K 3/356113 |
| | | | 363/147 |
| 2016/0094207 A1 * | 3/2016 | Crandall | H03K 3/02 |
| | | | 327/333 |
| 2018/0069537 A1 | 3/2018 | Kamimaru | |

* cited by examiner

400

CAPACITOR CROSS-COUPLED LEVEL SHIFTER

CROSS-REFERENCE TO RELATED APPLICATION

This application claims priority to India patent application Ser. No. 20/234,1033996 filed May 15, 2023, which is incorporated herein by reference.

BACKGROUND

This description relates to level shifters, such as level shifting circuits that may be used in charge pump circuits and voltage regulator circuits. A level shifter translates electrical signals from one voltage level to another voltage level. Low dropout voltage regulators (LDOs) may use a charge pump to produce a voltage for biasing the gate of a pass transistor, particularly if the pass transistor is an n-type transistor. A charge pump can use level shifters to generate the voltage needed for the gate drive signals. A capacitor cross-coupled level shifter may be used to generate a level shifted clock from a provided input clock. Also, a gate drive circuit for a high side switch in a switching voltage regulator may use a cross-coupled level shifter.

Circuit failures can occur in a traditional capacitor cross-coupled level shifter in the presence of line voltage transients. The transistors in the circuit may be exposed to voltages during the transient that exceed the maximum voltage rating of the transistor, leading to failure of the transistor. Additionally, transients on the supply voltage line can lead to an output of the level shifter getting latched at a single voltage level, causing failure of the level shifter circuit. A falling voltage line transient can lead to circuit failures in a cross-coupled level shifter using an n-type transistor, and rising voltage line transients can lead to circuit failures in a cross-coupled level shifter using a p-type transistor.

SUMMARY

In a first example, a level-shifter circuit includes a first buffer having a first buffer input and a first buffer output. The first buffer input is coupled to a first clock source. A second buffer has a second buffer input and a second buffer output. The second buffer input is coupled to a second clock source. A first capacitor has first and second capacitor terminals. The second capacitor terminal is coupled to the first buffer output. A second capacitor has third and fourth capacitor terminals. The fourth capacitor terminal is coupled to the second buffer output.

A first transistor is coupled between an input voltage terminal and the first capacitor terminal, and has a first control terminal. The first control terminal is coupled to the third capacitor terminal. A second transistor is coupled between the input voltage terminal and the third capacitor terminal, and has a second control terminal. The second control terminal is coupled to the first capacitor terminal. An overvoltage discharge circuit is coupled to the first capacitor terminal and the third capacitor terminal. The overvoltage discharge circuit is configured to reduce a voltage imbalance between a first voltage across the first capacitor and a second voltage across the second capacitor to within a threshold voltage in response to the voltage imbalance exceeding the threshold voltage.

In a second example, a level-shifter circuit includes a first buffer having a first buffer input, a first buffer output and a first buffer power supply terminal. The first buffer input is coupled to a first clock source. The first buffer power supply terminal is configured to receive a buffer power supply. A second buffer has a second buffer input, a second buffer output and a second buffer power supply terminal. The second buffer input is coupled to a second clock source, and the second buffer power supply terminal is configured to receive the buffer power supply.

A first capacitor has first and second capacitor terminals. The second capacitor terminal is coupled to the first buffer output. A second capacitor has third and fourth capacitor terminals. The fourth capacitor terminal is coupled to the second buffer output. A first transistor is coupled between an input voltage terminal and the first capacitor terminal, and has a first control terminal. The first control terminal is coupled to the third capacitor terminal.

a second transistor is coupled between the input voltage terminal and the third capacitor terminal, and has a second control terminal. The second control terminal is coupled to the first capacitor terminal. An undervoltage charge circuit is coupled to the first capacitor terminal and the third capacitor terminal. The overvoltage discharge circuit is configured to reduce a voltage imbalance between a first voltage across the first capacitor and a second voltage across the second capacitor to within a threshold voltage in response to the voltage imbalance exceeding the threshold voltage.

DETAILED DESCRIPTION

In this description, the same reference numbers depict same or similar (by function and/or structure) features. The drawings are not necessarily drawn to scale.

A capacitor cross-coupled level shifter may be used to accept a provided input clock and generate a level shifted clock from it. The level shifted clock can then be provided as a clock input to a charge pump circuit. The charge pump circuit can be used in a low dropout voltage regulator (LDO) to provide a bias voltage to a gate of a pass transistor.

Figure 1:
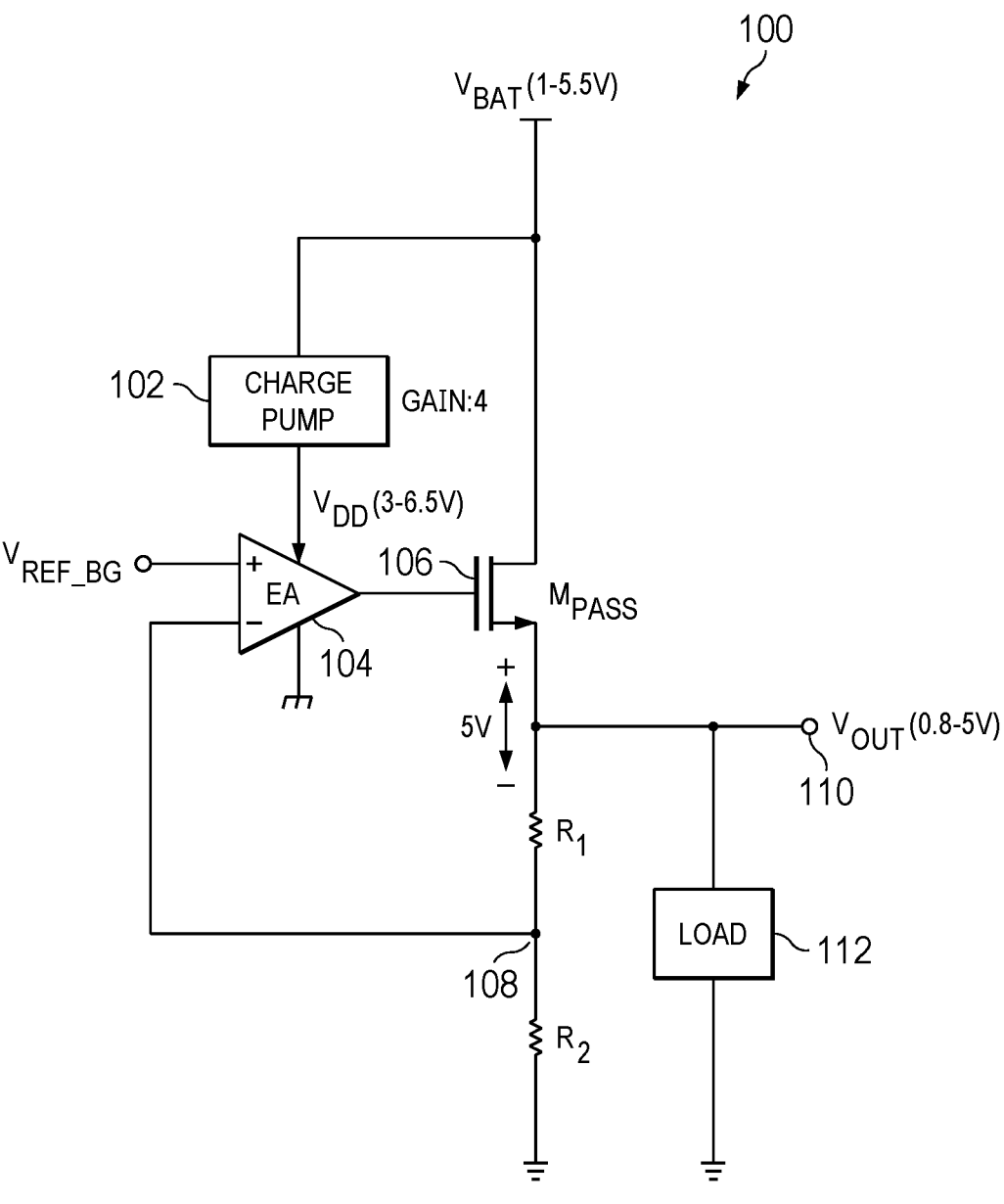
FIG. 1 shows a schematic diagram for an example LDO regulator having a charge pump.

FIG. 1 shows a schematic diagram for an example LDO 100 having a charge pump. LDO 100 has an error amplifier 104 having first and second inputs. The first input of error amplifier 104 is coupled to a reference voltage source $V_{REF\_BG}$. The second input of error amplifier 104 is coupled to a feedback voltage terminal 108. The output of error amplifier 104 is coupled to the gate of transistor 106.

Transistor 106 is an n-channel field effect transistor (NFET) that is coupled between a supply voltage $V_{BAT}$ and an output voltage terminal $V_{OUT}$ 110. Resistors $R_1$ and $R_2$ create a voltage divider of the voltage at the output voltage terminal $V_{OUT}$ 110, providing the feedback voltage at feedback voltage terminal 108. A load 112 is coupled between the output voltage terminal $V_{OUT}$ 110 and a ground terminal.

Because transistor 106 is an NFET, it will only be turned on when the voltage at its gate is higher than the voltage at its source by at least a threshold amount. The voltage at the source of transistor 106 is $V_{BAT}$. So, a voltage higher than $V_{BAT}$ is required at the gate to turn on transistor 106. The voltage at the gate of transistor 106 is supplied by the output of error amplifier 104. A supply voltage higher than $V_{BAT}$ is necessary for the output of error amplifier 104 to be higher than $V_{BAT}$.

Charge pump 102 provides the supply voltage for error amplifier 104. Charge pump 102 is a circuit having switches and capacitors that amplifies a voltage provided at its input terminal to provide a higher voltage at its output terminal. Charge pump 102 receives $V_{BAT}$ as an input and provides a higher voltage $V_{DD}$ as an output, which is provided as a supply voltage for error amplifier 104.

When using an NFET, if a voltage $V_{BAT}$ is provided at the source current terminal, a higher voltage is required at the gate (e.g. $2*V_{BAT}$) to turn on the NFET. However, it is not necessary to pull the gate voltage all the way down to 0V to turn off the NFET, and doing so would lead to higher gate drive losses. It is sufficient to drive the gate of the NFET between $V_{BAT}$ and $2*V_{BAT}$. So, instead of merely amplifying the voltage at $V_{BAT}$, a level shifter can be used that provides the same magnitude of voltage swing, but level-shifted. Charge pump 102 may include a capacitor cross-coupled level shifter.

Figure 2:
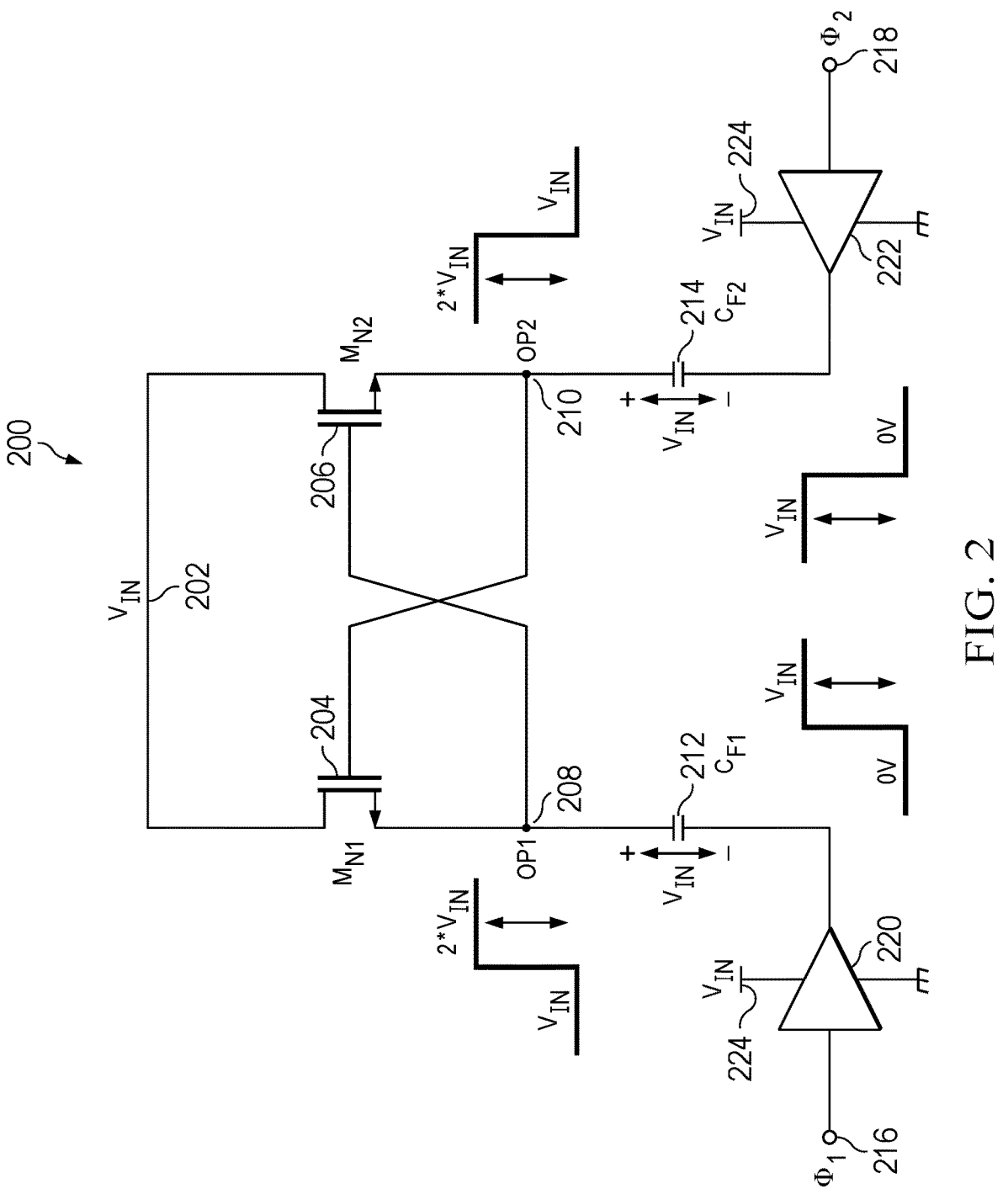
FIG. 2 shows a schematic diagram for an example traditional cross-coupled level shifter.

FIG. 2 shows a schematic diagram for an example traditional cross-coupled level shifter 200. Transistor 204 is an NFET coupled between a supply voltage terminal $V_{IN}$ 202 and a first output terminal OP1 208. Transistor 206 is an NFET coupled between the supply voltage terminal $V_{IN}$ 202 and a second output terminal OP2 210. The gate of transistor 204 is coupled to the second output terminal OP2 210, and the gate of transistor 206 is coupled to the first output terminal OP1 208.

A first clock $\phi1$ 216 has a voltage range from 0V to $V_{IN}$. A second clock $\phi2$ 218 is an inverted version of the first clock $\phi1$ 216 and has a voltage range from $V_{IN}$ to 0V. The first clock $\phi1$ 216 and the second clock $\phi2$ 218 are non-overlapping clocks that are 180 degrees out of phase. The first clock $\phi1$ 216 is provided to the input of buffer 220. The second clock $\phi2$ 218 is provided to the input of buffer 222. Capacitor $C_{F1}$ 212 is coupled between the output of buffer 220 and the first output terminal OP1 208. Capacitor $C_{F2}$ 214 is coupled between the output of buffer 222 and the second output terminal OP2 210.

The operation of cross-coupled level shifter 200 has two half-cycles. During the first half-cycle, $\phi1$ is at 0V and $\phi2$ is at $V_{IN}$. During the second half-cycle, $\phi1$ is at $V_{IN}$ and $\phi2$ is at 0V. In the first half-cycle, if the voltages across capacitors $C_{F1}$ 212 and $C_{F2}$ 214 are each at 0V, transistor 204 will be turned on because the gate is at a voltage of $V_{IN}$ and its source voltage is at 0V. The voltage at OP2 210 is at $V_{IN}$ because capacitor $C_{F2}$ 214 is initially uncharged. Capacitor $C_{F1}$ 212 will charge to $V_{IN}-V_{th}$ of transistor 204 during the first half cycle, so the voltage across $C_{F1}$ goes from 0V to $V_{IN}-V_{th}$ of transistor 204. When a steady-state condition is reached, the voltages across capacitor $C_{F1}$ 212 and capacitor $C_{F2}$ 214 are each at $V_{IN}$.

In the second half-cycle, capacitor $C_{F1}$ 212 is initially charged to a voltage of $V_{IN}-V_{th}$ of transistor 204, so OP1 208 is at a voltage of $2V_{IN}-V_{th}$ of transistor 204. Capacitor $C_{F2}$ 214 will charge from a voltage of 0V to $V_{IN}$. So, at the end of the second half-cycle, capacitor $C_{F1}$ 212 and capacitor $C_{F2}$ 214 will each be charged to a voltage of $V_{IN}$.

When a steady state is reached in the first half cycle, $\phi1$ 216 will be at a voltage of 0V, $\phi2$ 218 will be at a voltage of $V_{IN}$, and the voltages across $C_{F1}$ 212 and $C_{F2}$ 214 are each at $V_{IN}$. The voltage at OP1 208 is at $V_{IN}$, and the voltage at OP2 210 is at $2*V_{IN}$ because the voltage at $\phi2$ 218 is at $V_{IN}$. When the voltage $V_{IN}$ is added to the voltage from $C_{F2}$, the voltage at OP2 210 is $2*V_{IN}$.

When a steady state is reached in the second half-cycle, the opposite occurs. $\phi2$ 218 will be at a voltage of 0V, $\phi1$ 216 will be at a voltage of $V_{IN}$, and the voltages across $C_{F1}$ 212 and $C_{F2}$ 214 are each at $V_{IN}$. The voltage at OP2 210 is at $V_{IN}$, and the voltage at OP1 208 is at $2*V_{IN}$ because the voltage at $\phi1$ 216 is at $V_{IN}$. When the voltage $V_{IN}$ is added from $C_{F1}$, the voltage at OP1 208 is $2*V_{IN}$.

During either half-cycle, at most only one of either transistor 204 or transistor 206 will be turned on, and the other transistor will be turned off. During the first half cycle, the gate of transistor 204 will be at a voltage of $2*V_{IN}$, and the source of transistor 204 will be at $V_{IN}$ when steady state is reached. So, the gate-to-source voltage ($V_{gs}$) of transistor 204 will be equal to $V_{IN}$. Transistor 206 is turned off because its gate is at a voltage of $V_{IN}$ and its source is at a voltage of $2*V_{IN}$. So, the gate-to-source junction of transistor 206 is reverse biased and the transistor is turned off.

Figure 3:
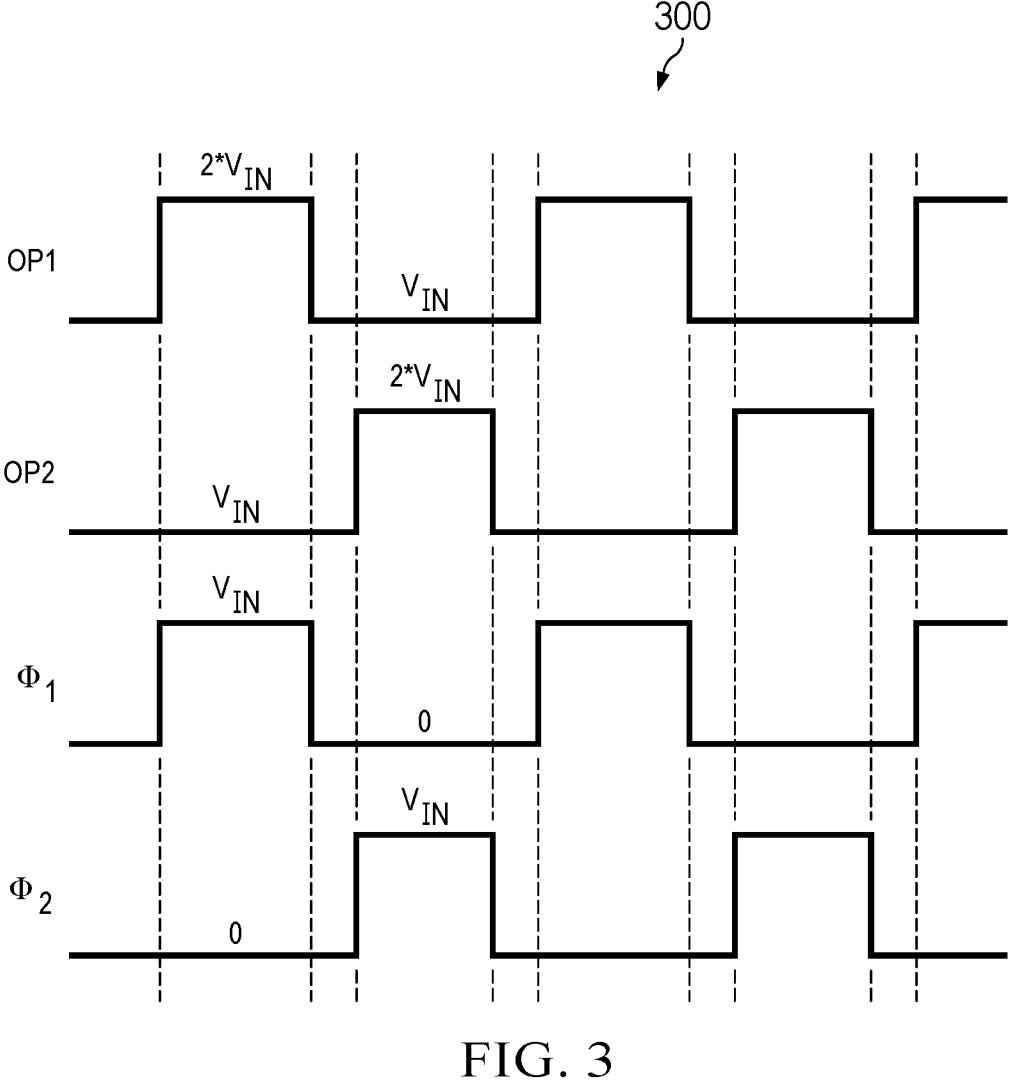
FIG. 3 shows an example timing diagram for two complete cycles of normal operation of a traditional cross-coupled level shifter.

During the second half-cycle, the gate of transistor 206 will be at a voltage of $2*V_{IN}$, and the source of transistor 206 will be at $V_{IN}$ when a steady state is reached. So, the $V_{gs}$ of transistor 206 will be equal to $V_{IN}$. Transistor 204 is turned off because its gate is at a voltage of $V_{IN}$ and its source is at a voltage of $2*V_{IN}$. So, the gate-to-source junction of transistor 204 is reverse biased, and transistor 204 is turned off. This cycle of first and second half-cycles continues to repeat. FIG. 3 shows a timing diagram 300 of the voltage signals for OP1 208, OP2 210, $\phi1$ 216 and $\phi2$ 218 in cross-coupled level shifter 200 through two complete cycles of normal operation.

A failure can occur in cross-coupled level shifter 200 if the voltage at the supply voltage terminal $V_{IN}$ 202 drops suddenly (e.g. from 5V to 2V) as a result of a transient condition from an initial voltage $V_{INi}$ to a second voltage $V_{INf}$. If $V_{IN}$ is providing power to transistor 204, transistor 206, buffer 220 and buffer 222, each of them will experience the same voltage drop in its supply voltage.

During the first half-cycle, the voltage $V_{IN}$ on $\phi2$ moves from $V_{INi}$ to $V_{INf}$. With transistor 204 turned on during the first half-cycle, both capacitor $C_{F1}$ 212 and capacitor $C_{F2}$ 214 are charged to a voltage of $V_{INi}$. After the voltage transient occurs, the voltage at OP2 210 will be $V_{INi}+V_{INf}$, not $2*V_{IN}$. This causes capacitor $C_{F1}$ 212 to discharge from $V_{INi}$ to $V_{INf}$ because transistor 204 is turned on and provides a current path.

The voltage across capacitor $C_{F1}$ 212 is now $V_{INf}$. However, the voltage across capacitor $C_{F2}$ 214 is still $V_{INi}$ because transistor 206 is turned off, so there is no current path for voltage discharge across capacitor $C_{F2}$. This creates a voltage imbalance between capacitor $C_{F1}$ 212 and capacitor $C_{F2}$ 214, which leads to a significant problem. Transistor 204 will always be turned on and transistor 206 will always be turned off. Therefore, no clock signal will be provided at the first output terminal OP1 208.

Figure 4:
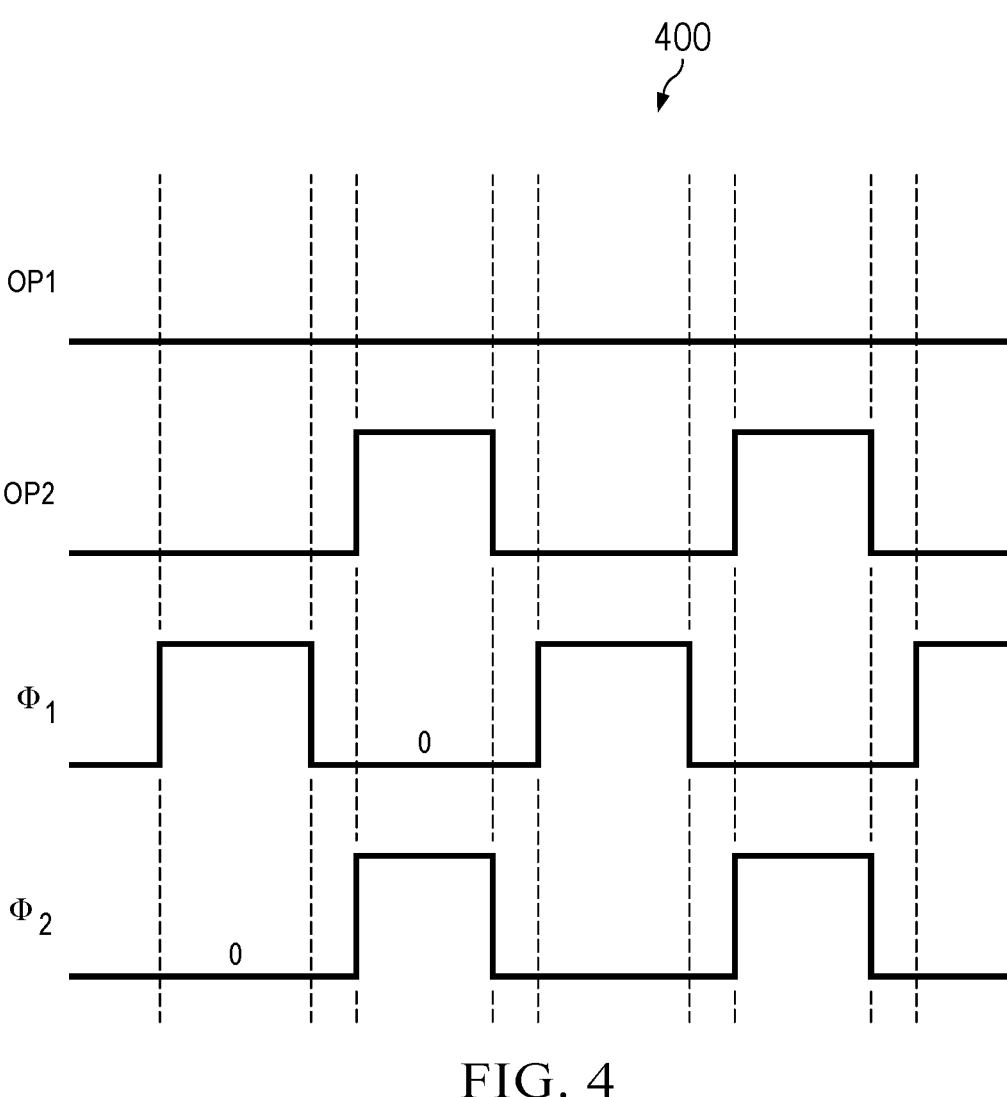
FIG. 4 shows an example timing diagram for two complete cycles of operation of a traditional cross-coupled level shifter following a transient in which the supply voltage drops suddenly.

During the second half-cycle, the voltage at the first output terminal OP1 208 is holding at $V_{INf}$ and the voltage at the second output terminal OP2 210 is holding at $V_{INi}$. Clock signals $\phi 1$ and $\phi 2$ are running from 0V to $V_{INf}$ and $V_{IN}$ to 0V. But, transistor 204 is always turned on and transistor 206 is always turned off because the difference in voltage between capacitor $C_{F1}$ 212 and capacitor $C_{F2}$ 214 will ensure that transistor 204 remains always on, and transistor 206 remains always off. If this occurs, the first output terminal OP1 208 will remain latched at a voltage of $V_{INf}$ and the second output terminal OP2 210 will go between $V_{INi}$ and $V_{INi}+V_{INf}$. Therefore, there is no longer a level-shifted clock being provided. FIG. 4 shows a timing diagram 400 of the voltages for OP1 208, OP2 210, $\phi 1$ 216 and $\phi 2$ 218 in cross-coupled level shifter 200 through two complete cycles of operation following a transient in which the supply voltage drops suddenly. Even if $\phi 1$ and $\phi 2$ are going from 0 to $V_{INf}$, there is still no level shifted output because the first output terminal OP1 208 is remaining constant at a voltage of $V_{INf}$ and the second output terminal OP2 210 is going between $V_{INi}$ and $V_{INi}+V_{INf}$.

If the cross-coupled level shifter is implemented in a charge pump circuit and the first output terminal OP1 208 becomes latched, the performance of the charge pump may be degraded, including a significant decrease in efficiency and a significant increase in ripple on the output signal. Also, the charge pump may only be able to support half the load currents. If the charge pump is implemented in an LDO, the LDO may fail to support full load currents because the gate of the pass transistor will be driven to a lower voltage, and the LDO will have increased switching noise.

Figure 5:
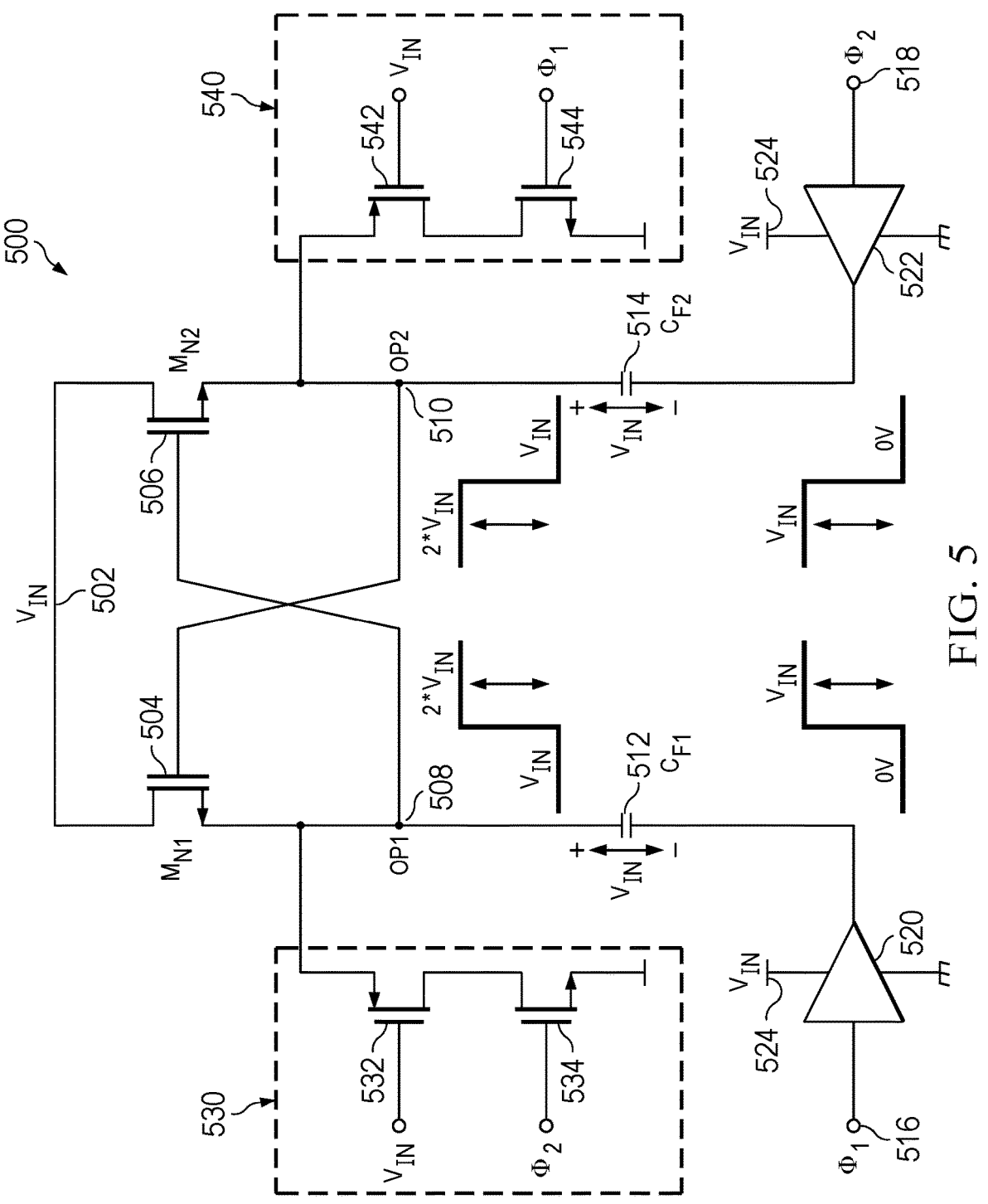
FIG. 5 shows a schematic diagram for an example cross-coupled level-shifter with an overvoltage discharge circuit.

This problem of the first output terminal OP1 becoming latched may be solved by adding circuitry that senses when an imbalance occurs between the voltages across capacitors $C_{F1}$ 212 and $C_{F2}$ 214, and balances the voltages across capacitors $C_{F1}$ 212 and $C_{F2}$ 214. FIG. 5 shows a schematic diagram for an example cross-coupled level-shifter 500 with an over voltage discharge circuit. The overvoltage discharge circuit includes overvoltage discharge sub-circuit 530 and overvoltage discharge sub-circuit 540.

Transistor 504 is an NFET coupled between a supply voltage terminal $V_{IN}$ 502 and a first output terminal OP1 508. Transistor 506 is an NFET coupled between the supply voltage terminal $V_{IN}$ 502 and a second output terminal OP2 510. The gate of transistor 504 is coupled to the second output terminal OP2 510, and the gate of transistor 506 is coupled to the first output terminal OP1 508.

A first clock $\phi 1$ 516 has a voltage range from 0V to $V_{IN}$. A second clock $\phi 2$ 518 is an inverted version of the first clock $\phi 1$ 516 and has a voltage range from $V_{IN}$ to 0V. The first clock $\phi 1$ 516 and the second clock $\phi 2$ 518 are 180 degrees out of phase. The first clock $\phi 1$ 516 is provided to the input of buffer 520. The second clock $\phi 2$ 518 is provided to the input of buffer 522. Capacitor $C_{F1}$ 512 is coupled between the output of buffer 520 and the first output terminal OP1 508. Capacitor $C_{F2}$ 514 is coupled between the output of buffer 522 and the second output terminal OP2 510.

The overvoltage discharge circuit includes overvoltage discharge sub-circuit 530 and overvoltage discharge sub-circuit 540. Overvoltage discharge sub-circuit 530 is coupled between the first output terminal OP1 508 and a ground terminal. Overvoltage discharge sub-circuit 530 includes transistor 532 and transistor 534. Transistor 532 is a p-channel field effect transistor (PFET) having a source coupled to the first output terminal OP1 508, and having a gate coupled to the supply voltage terminal $V_{IN}$ 502. Transistor 534 is an NFET having a drain coupled to the drain of transistor 532, a source coupled to the ground terminal, and a gate coupled to the second clock $\phi 2$ 518.

Overvoltage discharge sub-circuit 540 is coupled between the second output terminal OP2 510 and the ground terminal. Overvoltage discharge sub-circuit 540 includes transistor 542 and transistor 544. Transistor 542 is a PFET having a source coupled to the second output terminal OP2 510, and having a gate coupled to the supply voltage terminal $V_{IN}$ 502. Transistor 544 is an NFET having a drain coupled to the drain of transistor 542, a source coupled to the ground terminal, and a gate coupled to the first clock $\phi 1$ 516.

The operation of cross-coupled level shifter 500 has two half-cycles. During the first half-cycle, $\phi 1$ is at 0V and $\phi 2$ is at $V_{IN}$. During the second half-cycle, $\phi 1$ is at $V_{IN}$ and $\phi 2$ is at 0V. During the first half-cycle, transistor 504 will be turned on if the voltages across capacitors $C_{F1}$ 512 and $C_{F2}$ 514 are each at 0V because the voltage at the gate of transistor 504 is at $V_{IN}$ and the voltage at its source is at 0V. The voltage at the second output terminal OP2 510 is at $V_{IN}$ because capacitor $C_{F2}$ 514 is initially uncharged. During the first half-cycle, capacitor $C_{F1}$ 512 will charge to a voltage of $V_{IN}-V_{th}$ of transistor 504, so the voltage across capacitor $C_{F1}$ 512 goes from 0V to $V_{IN}-V_{th}$ of transistor 504. When a steady-state condition is reached, the voltages across capacitor $C_{F1}$ 512 and capacitor $C_{F2}$ 514 are each at $V_{IN}$.

In the second half-cycle, capacitor $C_{F1}$ 512 is initially charged to a voltage of $V_{IN}-V_{th}$ of transistor 504, so the first output terminal OP1 508 is at a voltage of $2*V_{IN}-V_{th}$ of transistor 504. Capacitor $C_{F2}$ 514 will charge from a voltage of 0V to $V_{IN}$. So, capacitor $C_{F1}$ 512 and capacitor $C_{F2}$ 514 will each be charged to a voltage of $V_{IN}$ at the end of the second half-cycle.

When a steady state is reached in the first half cycle, $\phi 1$ 516 will be at a voltage of 0V, $\phi 2$ 518 will be at a voltage of $V_{IN}$, and the voltages across capacitors $C_{F1}$ 512 and $C_{F2}$ 514 are each at $V_{IN}$. The voltage at the first output terminal OP1 508 is at $V_{IN}$, and the voltage at the second output terminal OP2 510 is at $2*V_{IN}$ because the voltage at $\phi 2$ 518 is at $V_{IN}$. When the voltage $V_{IN}$ is added to the voltage across capacitor $C_{F2}$, the voltage at the second output terminal OP2 510 is $2*V_{IN}$.

When a steady state is reached in the second half-cycle, the voltage at $\phi 2$ 518 will be at 0V, the voltage at $\phi 1$ 516 will be at $V_{IN}$, and the voltages across capacitors $C_{F1}$ 512 and $C_{F2}$ 514 are each at $V_{IN}$. The voltage at the second output terminal OP2 510 is at $V_{IN}$, and the voltage at the first output terminal OP1 508 is at $2*V_{IN}$ because the voltage at $\phi 1$ 516 is at $V_{IN}$. When the voltage $V_{IN}$ is added to the voltage across capacitor $C_{F1}$ 512, the voltage at the first output terminal OP1 508 is $2*V_{IN}$.

During either half-cycle, at most only one of either transistor 504 or transistor 506 will be turned on, and the other transistor will be turned off. During the first half cycle, the gate of transistor 504 will be at a voltage of $2*V_{IN}$, and the source of transistor 504 will be at $V_{IN}$ when steady state is reached. So, the gate-to-source voltage ($V_{gs}$) of transistor 504 will be equal to $V_{IN}$. Transistor 506 is turned off because its gate is at a voltage of $V_{IN}$ and its source is at a voltage of $2*V_{IN}$. So, the gate-to-source junction of transistor 506 is reverse biased and the transistor is turned off.

During the second half-cycle, the gate of transistor 506 will be at a voltage of $2*V_{IN}$, and the source of transistor 506 will be at $V_{IN}$ when steady state is reached. So, the $V_{gs}$ of transistor 506 will be equal to $V_{IN}$. Transistor 504 is turned off because its gate is at a voltage of $V_{IN}$ and its source is at a voltage of $2*V_{IN}$. So, the gate-to-source junction of transistor 504 is reverse biased, and transistor 504 is turned off. This cycle of first and second half-cycles continues to repeat.

Transistors 532, 534, 542 and 544 make up the overvoltage discharge circuit. The overvoltage discharge circuit detects and activates if either capacitor $C_{F1}$ 512 or capacitor $C_{F2}$ 514 has a higher voltage across it than the voltage at the supply voltage terminal $V_{IN}$ 502. As long as there is no significant imbalance between the voltages across capacitors $C_{F1}$ 512 and $C_{F2}$ 514, transistors 532, 534, 542 and 544 will not be turned on, and no current will flow through them.

For example, in the case where $\phi 2$ 518 is at 0V, if the voltage across capacitor $C_{F1}$ 212 and the voltage across capacitor $C_{F2}$ 214 are each at $V_{IN}$, the voltage at the second output terminal OP2 510 is at $V_{IN}$. So, the source of transistor 542 is at $V_{IN}$. This makes $V_{gs}$ of transistor 542 equal to zero, and transistor 542 remains turned off. With transistor 542 turned, transistor 544 will receive no current and will remain turned off. The voltage at $\phi 1$ 516 is at $V_{IN}$, and the voltage at the first output terminal OP1 508 is at $2*V_{IN}$. So, the voltage at the source of transistor 532 is at $2*V_{IN}$, making the $V_{gs}$ of transistor 532 equal to $V_{IN}$, so transistor 532 is turned on. However, with the voltage at $\phi 2$ 518 being at 0V and the source of transistor 534 being at 0V, the $V_{gs}$ of transistor 534 is 0V, and transistor 534 is turned off. So, there is no path for current to flow, and transistors 532 and 534 remain turned off.

If the voltage at supply voltage terminal $V_{IN}$ 502 drops from an initial voltage $V_{INi}$ to a lower second voltage $V_{INf}$, the voltage on capacitor $C_{F1}$ 512 will be $V_{INf}$ and the voltage on capacitor $C_{F2}$ 514 will be $V_{INi}$ when the first half cycle reaches a steady state. Overvoltage discharge sub-circuit 540 will be activated because there is a higher voltage at the second output terminal OP2 510 than at the gate of transistor 542. So, transistor 542 will be turned on because the $V_{gs}$ of transistor 542 will be $V_{INi}-V_{INf}$. When $\phi 1$ 516 turns on transistor 544, current will flow through transistors 542 and 544 to ground, causing capacitor $C_{F2}$ 514 to discharge from a voltage of $V_{INi}$ to a voltage of $V_{INf}$.

When capacitor $C_{F2}$ 514 reaches a voltage of $V_{IN}$ eliminating the voltage imbalance, the $V_{gs}$ of transistor 542 will be at 0V, and transistor 542 will be turned off. When transistor 542 is turned off, current will not flow through transistors 542 and 544, and normal operation of cross-coupled level-shifter 500 will resume. Transistor 532 will not be turned on if there is a proper voltage balance between capacitor $C_{F1}$ 512 and capacitor $C_{F2}$ 514. Transistor 532 is only turned on when there is an imbalance in the voltage provided to the first output terminal OP1 508 and the voltage provided to the second output terminal OP2 510.

If during the half-cycle where $\phi 1$ 516 is at 0V and $\phi 2$ 518 is at $V_{INf}$, the voltage across $C_{F1}$ is $V_{INf}$ and the voltage across $C_{F2}$ is $V_{INi}$, overvoltage discharge sub-circuit 530 will be activated. The signal $\phi 2$ 518, which is at a voltage of $V_{INf}$ is provided to the gate of transistor 534. The signal $\phi 1$ 516, which is at 0V, is provided to the gate of transistor 534. So, transistor 544 is turned off. Transistor 534 has a $V_{gs}$ of $V_{INf}$ which turns transistor 534 on. The voltage at the first output terminal OP1 508 is at $V_{INf}$ so transistor 532 is turned off. Overvoltage discharge sub-circuit 530 is not affecting the operation of the circuit even though there is a voltage imbalance between the first output terminal OP1 508 and the second output terminal OP2 510.

For the half cycle where the voltage of $\phi 1$ 516 is at $V_{INf}$ and the voltage of $\phi 2$ 518 is at 0V, the voltage across capacitor $C_{F1}$ 512 will remain at $V_{INf}$ and the voltage across capacitor $C_{F2}$ 514 will remain at $V_{INi}$, so the voltage imbalance between the two capacitors is still there. Transistor 534 has a $V_{gs}$ of 0V, so transistor 534 is turned off and current will not flow through transistors 532 and 534. Transistor 544 is turned on because the voltage at $\phi 1$ 516 is at $V_{INf}$ and the source of transistor 542 is at ground, so transistor 544 is turned on.

The voltage at the second output terminal OP2 510 is at $V_{INi}$, so the $V_{gs}$ of transistor 542 is $V_{INi}-V_{INf}$. Transistors 542 and 544 provide a current path to discharge capacitor $C_{F2}$ 514. Capacitor $C_{F2}$ 514 discharges until the voltage at the second output terminal OP2 510 is equal to $V_{IN}$ because $V_{gs}$=0V when the voltage at the second output terminal OP2 is equal to $V_{INf}$, and transistor 542 will be turned off, which turns off overvoltage discharge sub-circuit 540.

Some applications may benefit from a cross-coupled level shifter implemented with p-channel field effect transistors (PFETs), such as a gate drive circuit for a high side switch in a switching voltage regulator. However, a cross-coupled level shifter implemented with PFETs may have a similar problem as the cross-coupled level shifter implemented with NFETs because if the flying capacitors (i.e. $C_{F1}$ and $C_{F2}$) have a voltage imbalance between them, one of the FETs may always be turned on and the other FET may always be turned off. But, unlike in the case of the cross-coupled level shifter implemented with NFETs in which the failure occurs with a falling line transient, failures can occur in a cross-coupled level shifter implemented with PFETs when a rising line voltage transient occurs (such as when a load is released).

Figure 6:
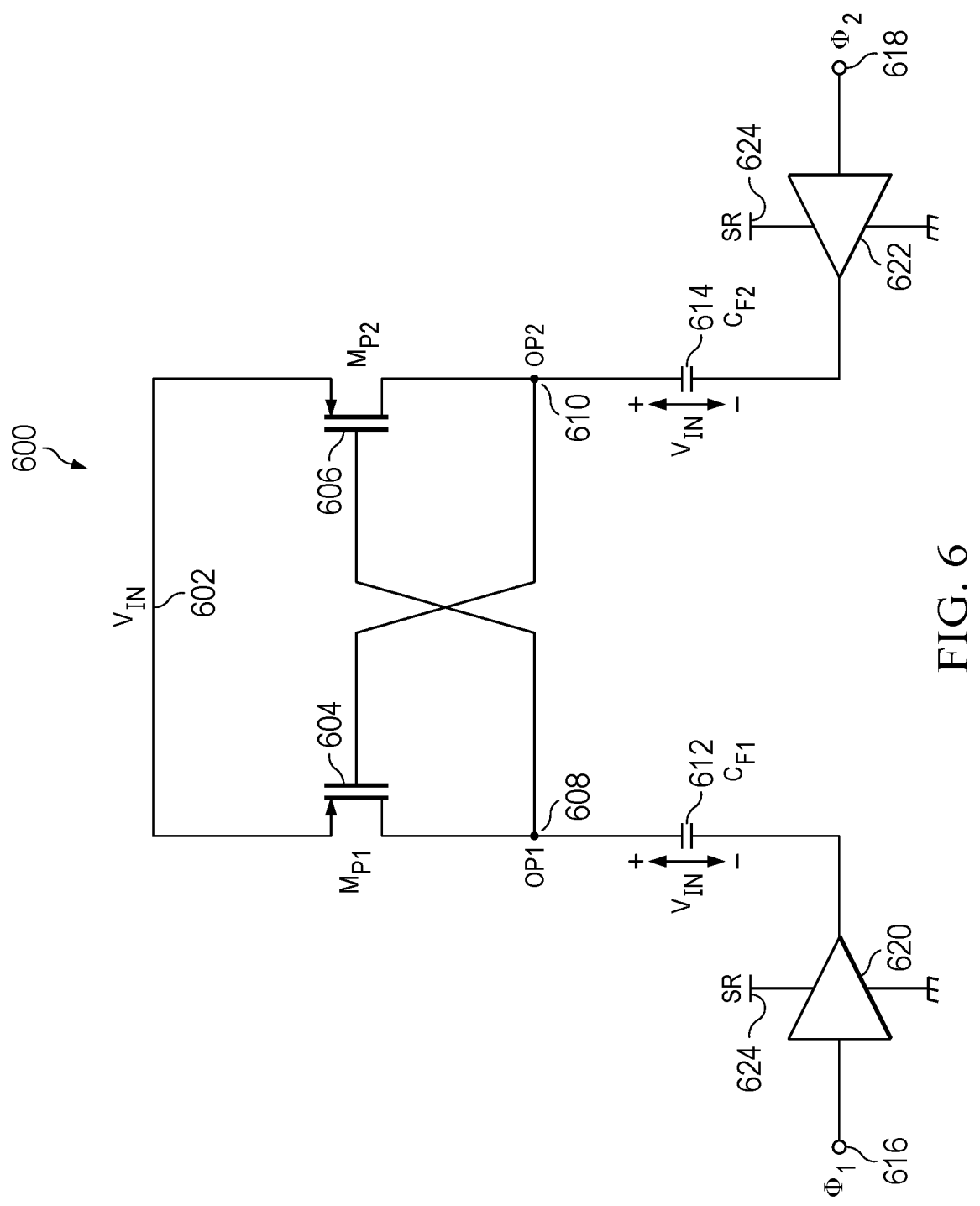
FIG. 6 shows a schematic diagram for an example cross-coupled level shifter with p-channel field effect transistors (PFETs).

FIG. 6 shows a schematic diagram for an example cross-coupled level shifter with PFETs 600. Transistor 604 is a PFET coupled between a supply voltage terminal $V_{IN}$ 602 and a first output terminal OP1 608. Transistor 606 is a PFET coupled between the supply voltage terminal $V_{IN}$ 602 and a second output terminal OP2 610. The gate of transistor 604 is coupled to the second output terminal OP2 610, and the gate of transistor 606 is coupled to the first output terminal OP1 608.

A first clock $\phi 1$ 616 is provided to the input of buffer 620. The second clock $\phi 2$ 618 is provided to the input of buffer 622. The second clock $\phi 2$ 618 is an inverted version of the first clock $\phi 1$ 616. The first clock $\phi 1$ 616 and the second clock $\phi 2$ 618 are non-overlapping clocks that are 180 degrees out of phase. Buffer 620 and buffer 622 are each powered by a sub-regulated supply 624 at a voltage SR. The voltage SR may be equal to or less than the voltage $V_{IN}$ 602. Capacitor $C_{F1}$ 612 is coupled between the output of buffer 620 and the first output terminal OP1 608. Capacitor $C_{F2}$ 614 is coupled between the output of buffer 622 and the second output terminal OP2 610.

Initially, capacitor $C_{F1}$ 612 and capacitor $C_{F2}$ 614 are uncharged, and clocks $\phi 1$ 616 and $\phi 2$ 618 are each at a voltage of SR. Transistors 604 and 606 are both turned on, and capacitors $C_{F1}$ 612 and $C_{F2}$ 614 are each charged to a voltage of $V_{IN}$–SR. The operation of cross-coupled level shifter 600 has two half-cycles. During the first half-cycle, $\phi 1$ is at a voltage of 0V and $\phi 2$ is at a voltage of SR. During the second half-cycle, $\phi 1$ is at a voltage of SR and $\phi 2$ is at a voltage of 0V. During the first half-cycle with $\phi 1$ at a voltage of 0V, transistor 606 is turned off and transistor 604 is turned on, charging capacitor $C_{F1}$ 612 to a voltage of $V_{IN}$–SR. The first output terminal OP1 608 is at a voltage of $V_{IN}$–SR, and the second output terminal OP2 610 is at a voltage of $V_{IN}$.

During the second half-cycle, $\phi 1$ is at a voltage of SR and $\phi 2$ is at a voltage of 0V. Transistor 604 turns off and transistor 606 turns on, charging capacitor $C_{F2}$ 614 to $V_{IN}$–SR. In steady state of the second half-cycle, capacitors $C_{F1}$ 612 and $C_{F2}$ 614 are each charged to a voltage of $V_{IN}$–SR. The first output terminal OP1 608 is at a voltage of $V_{IN}$, and the second output terminal OP2 610 is at a voltage of $V_{IN}$–SR. The first output terminal OP1 608 and the second output terminal OP2 610 each continue to swing between a voltage of $V_{IN}$–SR and a voltage of $V_{IN}$ during the first and second half-cycles.

However, a failure can occur in cross-coupled level shifter 600 if the voltage at $V_{IN}$ 602 rises suddenly as a result of a transient condition from an initial voltage $V_{INi}$ to a second voltage $V_{INf}$. At steady state of the first half-cycle, capacitor $C_{F1}$ 612 and capacitor $C_{F2}$ 614 are each holding at a voltage of $V_{IN}$–SR. The voltage from $\phi 1$ is at SR and the voltage from $\phi 2$ is at 0V. If a rising voltage transient occurs on the $V_{IN}$ 602, causing $V_{IN}$ 602 to go from a voltage of $V_{INi}$ to a voltage of $V_{INf}$, the voltage across capacitor $C_{F1}$ 612 will go to $V_{INf}$ because transistor 604 is turned on. The voltage across capacitor $C_{F2}$ 614 will remain at $V_{INi}$ because transistor 604 is turned off.

If $(V_{Inf}–V_{INi})>V_{TH}$ of transistor 604, then transistor 604 will always remain on. So, the voltage at first output terminal OP1 608 will remain latched at a constant voltage of $V_{INf}$. When the voltage from $\phi 2$ switches from 0V to SR, the voltage at the second output terminal OP2 610 switches from a voltage of $V_{INi}$ to a voltage of $V_{INi}$+SR. Although, the clock signal at the second output terminal OP2 610 will continue to function, the clock signal at the first output terminal OP1 608 being latched at a constant voltage will cause cross-coupled level shifter 600 to fail. So, an imbalance between the voltages across capacitors $C_{F1}$ 612 and $C_{F2}$ 614 that may be caused by a rising voltage transient can be solved by adding an undervoltage charge circuit coupled to cross-coupled level shifter 600.

Figure 7:
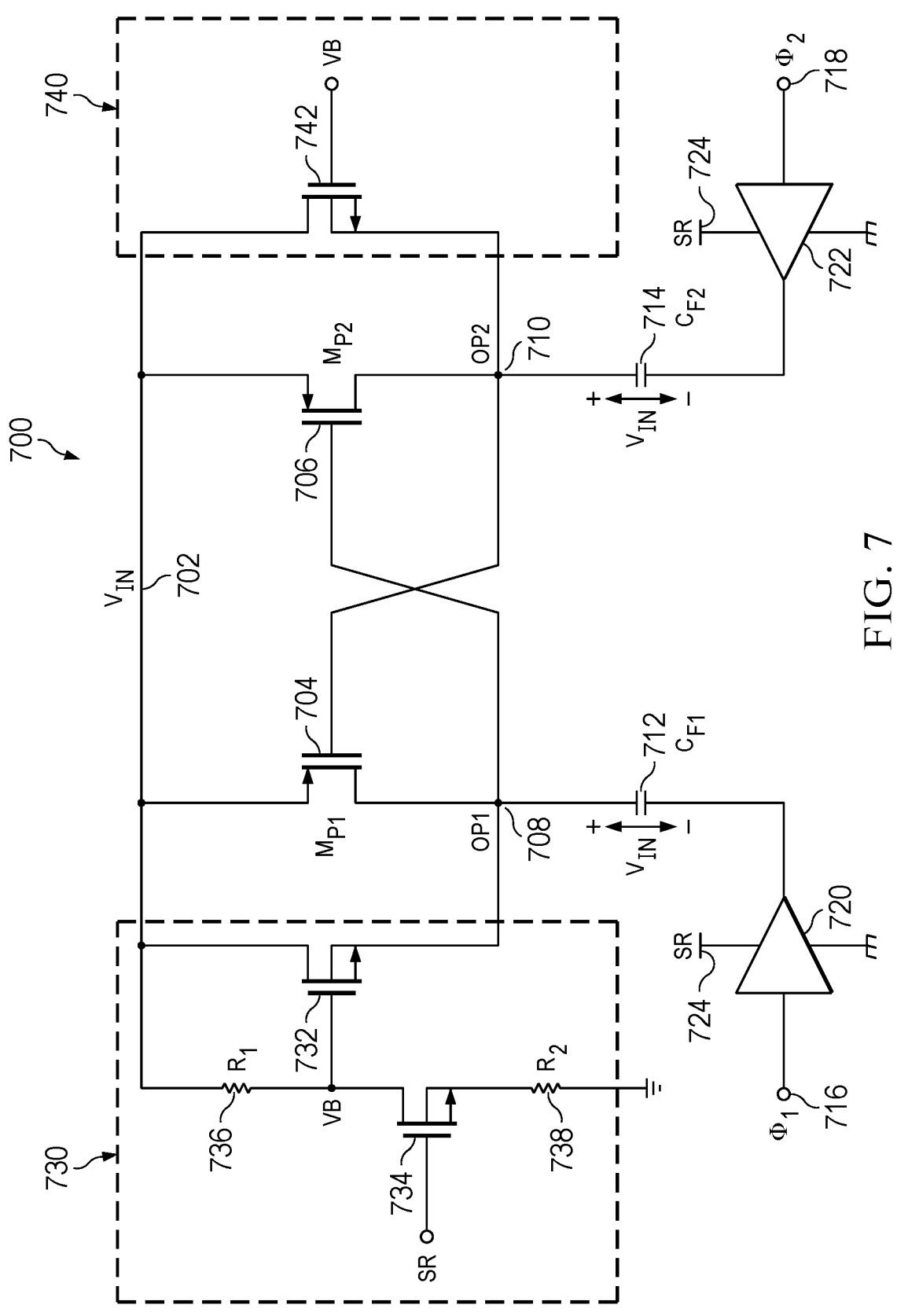
FIG. 7 shows a schematic diagram for an example cross-coupled level-shifter with an undervoltage charge circuit.

FIG. 7 shows a schematic diagram for an example cross-coupled level-shifter 700 with an undervoltage charge circuit. Transistor 704 is a PFET coupled between a supply voltage terminal $V_{IN}$ 702 and a first output terminal OP1 708. Transistor 706 is a PFET coupled between the supply voltage terminal $V_{IN}$ 702 and a second output terminal OP2 710. The gate of transistor 704 is coupled to the second output terminal OP2 710, and the gate of transistor 706 is coupled to the first output terminal OP1 708.

A first clock $\phi 1$ 716 is provided to the input of buffer 720. The second clock $\phi 2$ 718 is provided to the input of buffer 722. The second clock $\phi 2$ 718 is an inverted version of the first clock $\phi 1$ 716. The first clock $\phi 1$ 716 and the second clock $\phi 2$ 718 are non-overlapping clocks that are 180 degrees out of phase. Buffer 720 and buffer 722 are each powered by a sub-regulated voltage supply 724 at a voltage SR. The voltage SR may be equal to or less than the voltage at the supply voltage terminal $V_{IN}$ 702. Capacitor $C_{F1}$ 712 is coupled between the output of buffer 720 and the first output terminal OP1 708. Capacitor $C_{F2}$ 714 is coupled between the output of buffer 722 and the second output terminal OP2 710.

The undervoltage charge circuit includes undervoltage charge sub-circuit 730 and undervoltage charge sub-circuit 740. Undervoltage charge sub-circuit 730 is coupled between the source and drain of transistor 704. Undervoltage charge sub-circuit 730 includes transistors 732 and 734, and resistors 736 and 738. Transistor 732 is an NFET having a source coupled to the first output terminal OP1 708, a drain coupled to the supply voltage terminal $V_{IN}$ 702, and a gate coupled to an internal voltage bias terminal VB. Transistor 734 is an NFET having a drain coupled to the internal voltage bias terminal VB, a source coupled to the ground terminal through resistor 738, and a gate coupled to the sub-regulated voltage supply 724. Resistor 736 is coupled between the supply voltage terminal $V_{IN}$ 702 and the internal voltage bias terminal VB. In at least one case, resistor 736 and resistor 738 each have the same resistance, $R_1$. The voltage at the internal voltage bias terminal VB will be equal to $V_{IN}$–SR–$V_{TH}$ of transistor 732.

Undervoltage charge sub-circuit 740 is coupled between the source and drain of transistor 706. Undervoltage charge sub-circuit 740 includes transistor 742. The source of transistor 742 is coupled to the second output terminal OP2 710. The drain of transistor 742 is coupled to the supply voltage terminal $V_{IN}$ 702. The gate of transistor 742 is coupled the internal voltage bias terminal VB. As long as there is no significant imbalance between the voltages across capacitors $C_{F1}$ 712 and $C_{F2}$ 714, transistors 732, 734, and 742 will remain turned off and no current will flow through them or through resistors 736 and 738.

However, if the voltage at supply voltage terminal $V_{IN}$ 502 rises suddenly from an initial voltage $V_{INi}$ to a higher second voltage $V_{INf}$, the voltage on capacitor $C_{F1}$ 712 will be $V_{INf}$ and the voltage on capacitor $C_{F2}$ 714 will be $V_{INi}$ when the first half cycle reaches a steady state. The undervoltage charge circuit will be activated to bring the voltage across both capacitor $C_{F1}$ 712 and capacitor $C_{F2}$ 714 to a voltage of $V_{INf}$.

The current through resistor 738 is equal to $(SR–V_{TH})/R_1$. The voltage at VB is equal to $V_{IN}$–SR+$V_{th}$. The voltage at OP1 is VB–$V_{th}$. Therefore, the voltage at the first output terminal OP1 708 is equal to $V_{IN}$–SR. So, transistor 732 will only turn on if the voltage at the first output terminal OP1 708 is lower than $V_{IN}$–SR. Otherwise, transistor 732 remains turned off. Similarly, transistor 742 will only turn on if the voltage at the second output terminal OP2 710 is lower than $V_{IN}$–SR. If the voltage across capacitor $C_{F1}$ 712 or $C_{F2}$ 714 drops below $V_{IN}$–SR, then undervoltage charge sub-circuit 730 or undervoltage charge sub-circuit 740, respectively, will begin functioning until that capacitor is charged to a voltage of $V_{IN}$–SR, at which time regular operation of cross-coupled level-shifter 700 will commence again.

In this description, "terminal," "node." "interconnection." "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, the term "couple" may cover connections, communications or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, so device B is controlled by device A via the control signal generated by device A.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A level-shifter circuit comprising:
a first buffer having a first buffer input and a first buffer output, wherein the first buffer input is coupled to a first clock source;
a second buffer having a second buffer input and a second buffer output, wherein the second buffer input is coupled to a second clock source;
a first capacitor having first and second capacitor terminals, wherein the second capacitor terminal is coupled to the first buffer output;
a second capacitor having third and fourth capacitor terminals, wherein the fourth capacitor terminal is coupled to the second buffer output;
a first transistor coupled between an input voltage terminal and the first capacitor terminal and having a first control terminal, wherein the first control terminal is coupled to the third capacitor terminal;
a second transistor coupled between the input voltage terminal and the third capacitor terminal and having a second control terminal, wherein the second control terminal is coupled to the first capacitor terminal; and
an overvoltage discharge circuit, wherein the overvoltage discharge circuit includes:
a third transistor coupled to the first capacitor terminal and having a third control terminal, wherein the third control terminal is coupled to the input voltage terminal;
a fourth transistor coupled between the third transistor and a ground terminal and having a fourth control terminal, wherein the fourth control terminal is coupled to the second clock source;
a fifth transistor coupled to the third capacitor terminal and having a fifth control terminal, wherein the fifth control terminal is coupled to the input voltage terminal; and
a sixth transistor coupled between the fifth transistor and the ground terminal and having a sixth control terminal, wherein the sixth control terminal is coupled to the first clock source.

2. The level-shifter circuit of claim 1, wherein the first and second transistors are each n-channel field effect transistors (NFETs).

3. The level-shifter circuit of claim 1, wherein the first clock source provides a first clock signal to the first buffer input, and the second clock source provides a second clock signal to the second buffer input, in which the first clock signal and the second clock signal are 180 degrees out of phase.

4. The level-shifter circuit of claim 3, further comprising:
a first output terminal configured to provide a first output clock signal, wherein the first output clock signal is a level-shifted version of the first clock signal; and
a second output terminal configured to provide a second output clock signal, wherein the second output clock signal is a level-shifted version of the second clock signal.

5. The level-shifter circuit of claim 4, wherein a magnitude of voltage level shift of the first output clock signal and the second output clock signal is equal to a voltage of a power supply for the first and second buffers.

6. The level-shifter circuit of claim 1, wherein the overvoltage discharge circuit is configured to reduce a voltage imbalance between a first voltage across the first capacitor and a second voltage across the second capacitor to within a threshold voltage responsive to the voltage imbalance exceeding the threshold voltage.

7. The level-shifter circuit of claim 1, wherein the first, second, fifth and sixth transistors are each n-channel field effect transistors (NFETs) and the third and fourth transistors are each p-channel field effect transistors (PFETs).

8. The level-shifter circuit of claim 1, wherein the level-shifter circuit is included in a charge pump circuit.

9. The level-shifter circuit of claim 8, wherein the charge pump circuit is included in a low drop out voltage regulator (LDO).

10. An apparatus comprising:
a first buffer having a first buffer input, a first buffer output and a first buffer power supply terminal, wherein the first buffer input is coupled to a first clock source, and the first buffer power supply terminal is configured to receive a buffer power supply;
a second buffer having a second buffer input, a second buffer output and a second buffer power supply terminal, wherein the second buffer input is coupled to a second clock source, and the second buffer power supply terminal is configured to receive the buffer power supply;
a first capacitor having first and second capacitor terminals, wherein the second capacitor terminal is coupled to the first buffer output;
a second capacitor having third and fourth capacitor terminals, wherein the fourth capacitor terminal is coupled to the second buffer output;
a first transistor coupled between an input voltage terminal and the first capacitor terminal and having a first control terminal, wherein the first control terminal is coupled to the third capacitor terminal;
a second transistor coupled between the input voltage terminal and the third capacitor terminal and having a second control terminal, wherein the second control terminal is coupled to the first capacitor terminal; and
a circuit configured to reduce a voltage imbalance between a first voltage across the first capacitor and a second voltage across the second capacitor, wherein the circuit includes: a third transistor coupled between the input voltage terminal and the first capacitor terminal and having a third control terminal, wherein the third control terminal is coupled to a bias voltage terminal;
a fourth transistor coupled between the bias voltage terminal and a ground terminal and having a fourth control terminal, wherein the fourth control terminal is coupled to the buffer power supply; and
a fifth transistor coupled between the input voltage terminal and the third capacitor terminal and having a fifth control terminal, wherein the fifth control terminal is coupled to the bias voltage terminal.

11. The apparatus of claim 10, wherein the first and second transistors are each p-channel field effect transistors (PFETs).

12. The apparatus of claim 10, wherein the first clock source provides a first clock signal to the first buffer input, and the second clock source provides a second clock signal to the second buffer input, in which the first clock signal and the second clock signal are 180 degrees out of phase.

13. The apparatus of claim 12, further comprising:

a first output terminal configured to provide a first output clock signal, wherein the first output clock signal is a level-shifted version of the first clock signal; and a second output terminal configured to provide a second output clock signal, wherein the second output clock signal is a level-shifted version of the second clock signal.

14. The apparatus of claim 13, wherein a magnitude of the first output clock signal and the second output clock signal is equal to a voltage difference between a voltage at the input voltage terminal and a voltage of the buffer power supply.

15. The apparatus of claim 10, wherein the circuit is configured to reduce the voltage imbalance between the first voltage and the second voltage to within a threshold voltage responsive to the voltage imbalance exceeding the threshold voltage.

16. The apparatus of claim 10, further including first and second resistors having an equal resistance, wherein the first resistor is coupled between the input voltage terminal and the bias voltage terminal, and the second resistor is coupled between the fourth transistor and the ground terminal.

17. The apparatus of claim 16, wherein the first and second transistors are each p-channel field effect transistors (PFETs), and the third, fourth and fifth transistors are each n-channel field effect transistors (NFETs).

18. The apparatus of claim 10, wherein the apparatus is included in a charge pump circuit.

19. The apparatus of claim 18, wherein the charge pump circuit is included in a low drop out voltage regulator (LDO).

20. A level-shifter circuit comprising:

a first buffer having a first buffer input and a first buffer output;

a second buffer having a second buffer input and a second buffer output;

a first capacitor having first and second capacitor terminals, wherein the second capacitor terminal is coupled to the first buffer output;

a second capacitor having third and fourth capacitor terminals, wherein the fourth capacitor terminal is coupled to the second buffer output;

a first transistor coupled between an input voltage terminal and the first capacitor terminal and having a first control terminal, wherein the first control terminal is coupled to the third capacitor terminal;

a second transistor coupled between the input voltage terminal and the third capacitor terminal and having a second control terminal, wherein the second control terminal is coupled to the first capacitor terminal;

a first circuit coupled to the first capacitor terminal and capable of connecting the first capacitor terminal to a reference terminal responsive to a first transient event at the input voltage terminal; and a second circuit coupled to the third capacitor terminal and capable of connecting the third capacitor terminal to the reference terminal responsive to a second transient event at the input voltage terminal.

21. The level-shifter circuit of claim 20, wherein the first buffer input and the second buffer input are coupled to the reference terminal.

22. A level-shifter circuit comprising:

a first buffer having a first buffer input and a first buffer output;

a second buffer having a second buffer input and a second buffer output;

a first capacitor having first and second capacitor terminals, wherein the second capacitor terminal is coupled to the first buffer output;

a second capacitor having third and fourth capacitor terminals, wherein the fourth capacitor terminal is coupled to the second buffer output;

a first transistor coupled between an input voltage terminal and the first capacitor terminal and having a first control terminal, wherein the first control terminal is coupled to the third capacitor terminal;

a second transistor coupled between the input voltage terminal and the third capacitor terminal and having a second control terminal, wherein the second control terminal is coupled to the first capacitor terminal;

a first circuit coupled to the first capacitor terminal and capable of connecting the first capacitor terminal to a power terminal responsive to a first transient event at the input voltage terminal; and a second circuit coupled to the third capacitor terminal and capable of connecting the third capacitor terminal to the power terminal responsive to a second transient event at the input voltage terminal.

23. The level-shifter circuit of claim 22, wherein the first buffer input and the second buffer input are coupled to the power terminal.

24. A system, comprising:

a power source having a power source terminal;

a load having a load terminal;

a first buffer having a first buffer input and a first buffer output;

a first transistor coupled between the power source terminal and the load terminal and having a first control terminal, wherein the first control terminal is coupled to the first buffer output; and a level-shifter circuit having a level-shifter input and a level-shifter output, wherein the level-shifter input is coupled to the power source terminal, the level-shifter output is coupled to the first control terminal, and the level-shifter circuit comprising:

a second buffer having a second buffer input and a second buffer output;

a third buffer having a third buffer input and a third buffer output;

a first capacitor having first and second capacitor terminals, wherein the second capacitor terminal is coupled to the second buffer output;

a second capacitor having third and fourth capacitor terminals, wherein the fourth capacitor terminal is coupled to the third buffer output;

a second transistor coupled between an input voltage terminal and the first capacitor terminal and having a second control terminal, wherein the second control terminal is coupled to the third capacitor terminal;

a third transistor coupled between the input voltage terminal and the third capacitor terminal and having a third control terminal, wherein the third control terminal is coupled to the first capacitor terminal;

a first circuit coupled to the first capacitor terminal and capable of connecting the first capacitor terminal to a reference terminal responsive to a first transient event at the input voltage terminal; and a second circuit coupled to the third capacitor terminal and capable of connecting the third capacitor terminal to the reference terminal responsive to a second transient event at the input voltage terminal.

\* \* \* \* \*